United States Patent
Maehara

(10) Patent No.: US 10,867,728 B2
(45) Date of Patent: Dec. 15, 2020

(54) METHOD OF PRODUCING ANISOTROPIC MAGNETIC POWDER

(71) Applicant: NICHIA CORPORATION, Anan (JP)

(72) Inventor: Hisashi Maehara, Itano-gun (JP)

(73) Assignee: NICHIA CORPORATION, Anan (JP)

( * ) Notice: Subject to any disclaimer, the term of this patent is extended or adjusted under 35 U.S.C. 154(b) by 96 days.

(21) Appl. No.: 16/227,941

(22) Filed: Dec. 20, 2018

(65) Prior Publication Data

US 2019/0198207 A1   Jun. 27, 2019

(30) Foreign Application Priority Data

Dec. 22, 2017   (JP) .................................. 2017-246741
Dec. 6, 2018   (JP) .................................. 2018-229110

(51) Int. Cl.

| | |
|---|---|
| *B22F 9/22* | (2006.01) |
| *H01F 1/059* | (2006.01) |
| *H01F 1/055* | (2006.01) |
| *C01B 21/06* | (2006.01) |
| *B22F 1/00* | (2006.01) |
| *B22F 9/24* | (2006.01) |
| *B22F 1/02* | (2006.01) |

(52) U.S. Cl.
CPC ................ *H01F 1/059* (2013.01); *B22F 9/22* (2013.01); *C01B 21/06* (2013.01); *H01F 1/0558* (2013.01); *B22F 1/0085* (2013.01); *B22F 1/02* (2013.01); *B22F 9/24* (2013.01); *B22F 2301/355* (2013.01); *B22F 2999/00* (2013.01); *C01P 2006/42* (2013.01)

(58) Field of Classification Search
None
See application file for complete search history.

(56) References Cited

U.S. PATENT DOCUMENTS

| | | | | |
|---|---|---|---|---|
| 6,334,908 | B1* | 1/2002 | Kawano | B22F 9/20 |
| | | | | 148/301 |
| 6,758,918 | B2* | 7/2004 | Iriyama | B22F 1/0055 |
| | | | | 148/101 |
| 2002/0129872 | A1* | 9/2002 | Ohashi | H01F 1/0596 |
| | | | | 148/103 |
| 2017/0186519 | A1* | 6/2017 | Maehara | C22C 38/12 |

FOREIGN PATENT DOCUMENTS

| | | |
|---|---|---|
| JP | H05-78715 A | 3/1993 |
| JP | 2008-171868 A | 7/2008 |
| JP | 2014236195 A | * 12/2014 |

OTHER PUBLICATIONS

English translation of JP 2014-236195 (originally published Dec. 2014) downloaded from Espacenet.*

* cited by examiner

*Primary Examiner* — George Wyszomierski
(74) *Attorney, Agent, or Firm* — Hunton Andrews Kurth LLP

(57) ABSTRACT

The present invention relates to a method of producing an anisotropic magnetic powder having good magnetic properties. The method of producing an anisotropic magnetic powder includes: pretreating an oxide containing Sm and Fe by heat treatment in a reducing gas atmosphere to obtain a partial oxide; heat treating the partial oxide in the presence of a reductant at a first temperature of 1000° C. or higher and 1090° C. or lower and then at a second temperature lower than the first temperature and in the range of 980° C. or higher and 1070° C. or lower to obtain alloy particles; and nitriding the alloy particles to obtain an anisotropic magnetic powder.

7 Claims, No Drawings

METHOD OF PRODUCING ANISOTROPIC MAGNETIC POWDER

CROSS-REFERENCE TO RELATED PATENT APPLICATION

This application claims priority to Japanese Patent Application No. 2017-246741 filed on Dec. 22, 2017 and Japanese Patent Application No. 2018-229110 filed on Dec. 6, 2018. The disclosures of Japanese Patent Application No. 2017-246741 and Japanese Patent Application No. 2018-229110 are hereby incorporated by reference in their entireties.

BACKGROUND

Technical Field

The present invention relates to a method of producing an anisotropic magnetic powder.

Description of Related Art

JP 2008-171868 A discloses a method of producing a rare earth-iron-nitrogen anisotropic magnetic powder in which a starting powder is mixed with a reductant, and subsequently a rare earth oxide powder is reduced and diffused into iron. However, the anisotropic magnetic powder has insufficient magnetic properties, and there is room for improvement.

JP H05-78715 A discloses a method of producing a rare earth metal-containing alloy powder in which a rare earth metal oxide is subjected to an initial reduction-diffusion step and then to a second reduction-diffusion step. However, this method is intended to produce a neodymium magnetic material, and involves reduction-diffusion at a very low temperature to reduce sagging of some low melting point alloy components to the bottom of a reaction vessel during the production of a neodymium magnetic material.

SUMMARY

The present invention aims to provide a method of producing an anisotropic magnetic powder having good magnetic properties.

The present inventor conducted various studies on heat treatment temperature profile in order to improve magnetic properties. As a result, it has been found that an anisotropic magnetic powder having improved magnetic properties may be produced by heat treating a partial oxide in the presence of a reductant at a first temperature and then at a second temperature lower than the first temperature. This finding has led to the completion of the present invention.

Specifically, the present invention relates to a method of producing an anisotropic magnetic powder, including: pretreating an oxide containing Sm and Fe by heat treatment in a reducing gas atmosphere to obtain a partial oxide; heat treating the partial oxide in the presence of a reductant at a first temperature of 1000° C. or higher and 1090° C. or lower and then at a second temperature lower than the first temperature and in the range of 980° C. or higher and 1070° C. or lower to obtain alloy particles; and nitriding the alloy particles to obtain an anisotropic magnetic powder.

According to the method of producing an anisotropic magnetic powder of the present invention in which a partial oxide is heat treated in the presence of a reductant at a first temperature and then at a second temperature lower than the first temperature, it is possible to produce a magnetic powder having good magnetic properties, particularly good coercive force.

DETAILED DESCRIPTION

Embodiments of the present invention are described in detail below. The following embodiments, however, are intended as examples to embody the technical idea of the present invention and are not intended to limit the scope of the present invention to the following embodiments. As used herein, the term "step" encompasses not only an independent step but also a step that may not be clearly distinguished from other steps, as long as a desired object of the step is achieved. Moreover, numerical ranges indicated using "to" refer to ranges including the numerical values indicated before and after "to" as the minimum and maximum, respectively.

The method of producing an anisotropic magnetic powder according the present embodiment includes: pretreating an oxide containing Sm and Fe by heat treatment in a reducing gas atmosphere to obtain a partial oxide; heat treating the partial oxide in the presence of a reductant at a first temperature of 1000° C. or higher and 1090° C. or lower and then at a second temperature lower than the first temperature and in the range of 980° C. or higher and 1070° C. or lower to obtain alloy particles; and nitriding the alloy particles to obtain an anisotropic magnetic powder.

Generally, SmFeN powder is known to have the highest coercive force when its average particle size is around 3 μm. When particles are heat treated only at a first temperature in the presence of a reductant, strong bonding (necking) of many particles can occur because of the insufficient heat treatment. Such strongly bonded necked particles are prevented from individually rotating in a magnetic field, thereby resulting in poor magnetic field orientation and reduced coercive force. As a measure against necking, for example, prolonging the heat treatment at a first temperature can eliminate necking by causing fusion of particles, but may reduce coercive force as coarse particles greater than 3 μm can be formed. In contrast, when particles are heat treated at a first temperature and then at a second temperature lower than the first temperature as in embodiments of the present invention, it is considered that since necked particles are individually separated without being fused, it is possible to eliminate necking while reducing formation of coarse particles to produce an anisotropic magnetic powder having improved coercive force.

The oxide containing Sm and Fe used in the pretreatment step may be prepared by mixing a Sm oxide and a Fe oxide. For example, it may be prepared by mixing a solution containing Sm and Fe with a precipitating agent to obtain a precipitate containing Sm and Fe (precipitation step), and calcining the precipitate to obtain an oxide containing Sm and Fe (oxidation step).

Precipitation Step

In the precipitation step, a Sm source and a Fe source may be dissolved in a strongly acidic solution to prepare a solution containing Sm and Fe. When the main phase to be obtained is $Sm_2Fe_{17}N_3$, the molar ratio of Sm to Fe (Sm:Fe) is preferably 1.6:17 to 3.0:17, more preferably 2.0:17 to 2.6:17. To the solution may be added La, W, Co, Ti, Sc, Y, Pr, Nd, Pm, Gd, Tb, Dy, Ho, Er, Tm, Lu, or other sources. La is preferable in terms of remanence; W is preferable in terms of coercive force and squareness ratio; and Co is preferable in terms of temperature characteristics.

The Sm source and the Fe source are not limited as long as they are soluble in a strongly acidic solution. From an availability standpoint, for example, the Sm source may be an oxide of Sm, and the Fe source may be $FeSO_4$. The concentration of the solution containing Sm and Fe may be appropriately adjusted within a range that allows the Sm and Fe sources to substantially dissolve in the acidic solution. The acidic solution may be a sulfuric acid solution because of its ability to dissolve the Sm and Fe sources.

The solution containing Sm and Fe may be reacted with a precipitating agent to obtain an insoluble precipitate containing Sm and Fe. The solution containing Sm and Fe used is not limited as long as Sm and Fe are present in a solution during the reaction with the precipitating agent. For example, sources respectively containing Sm and Fe may be prepared as separate solutions and individually added dropwise to react with the precipitating agent. When the sources are prepared as separate solutions, the concentration of each solution may also be appropriately adjusted within a range that allows the corresponding source to substantially dissolve in the acidic solution. The precipitating agent is not limited as long as it is an alkaline solution that reacts with the solution containing Sm and Fe to give a precipitate. Examples include ammonia water and caustic soda (i.e., sodium hydroxide), with caustic soda being preferable.

The precipitation reaction is preferably performed by adding dropwise each of the solution containing Sm and Fe and the precipitating agent to a solvent such as water because this allows for easy adjustment of the properties of the particles of the precipitate. A precipitate having a uniform distribution of the constituent elements, a sharp particle size distribution, and a uniform powder particle shape may be produced by appropriately controlling conditions such as the feeding rates of the solution containing Sm and Fe and the precipitating agent, reaction temperature, reaction solution concentration, and pH during the reaction. The use of such a precipitate improves the magnetic properties of the final magnetic powder. The reaction temperature may be 0 to 50° C., preferably 35 to 45° C. The reaction solution concentration is preferably 0.65 mol/L to 0.85 mol/L, more preferably 0.7 mol/L to 0.85 mol/L, calculated as total metal ion concentration. The reaction pH is preferably 5 to 9, more preferably 6.5 to 8.

From a magnetic property standpoint, the solution containing Sm and Fe preferably further contains La, W, and/or Co. The La source is not limited as long as it is soluble in a strongly acidic solution. From an availability standpoint, for example, it may be $LaCl_3$. The concentration may be appropriately adjusted within a range that allows the Sm and Fe sources and the La, W, and/or Co sources to substantially dissolve in the acidic solution. The acidic solution may be a sulfuric acid solution because of its solubility. The W source may be ammonium tungstate, and the Co source may be cobalt sulfate. These sources are each preferably prepared separately from the solution containing Sm and Fe and at a concentration within a range that allows it to substantially dissolve in water.

When the solution containing Sm and Fe further contains La, W, and/or Co, an insoluble precipitate containing Sm and Fe with La, W, and/or Co will be produced. The solution is not limited as long as Sm and Fe, and La, W, and/or Co are present during the reaction with the precipitating agent. For example, these sources may be prepared as separate solutions and individually added dropwise to react with the precipitating agent. Alternatively, La, W, and/or Co may be prepared into the same solution containing Sm and Fe.

The anisotropic magnetic particles obtained in the precipitation step substantially determine the powder particle size, powder particle shape, and particle size distribution of the final magnetic powder. When the particle size of the particles is measured with a laser diffraction wet particle size analyzer, all the particles preferably have a size and distribution that substantially fall within the range of 0.05 to 20 μm, preferably 0.1 to 10 μm. Moreover, the average particle size is defined as the particle size corresponding to the 50th percentile by volume from the smallest particle size in a particle size distribution, and it is preferably in the range of 0.1 to 10 μm.

The precipitate, after being separated, is preferably subjected to solvent removal in order to reduce aggregation of the precipitate caused by evaporation of the residual solvent in which the precipitate has re-dissolved during the heat treatment in the subsequent oxidation step, and to reduce changes in properties such as particle size distribution and powder particle size. When the solvent used is water, for example, a specific solvent removal method may include drying in an oven at 70 to 200° C. for 5 to 12 hours.

The precipitation step may be followed by washing and separating the resultant precipitate. The step of washing may be appropriately performed until the conductivity of the supernatant reaches 5 $mS/m^2$ or lower. The step of separating the precipitate may be performed, for example, by adding and mixing a solvent, preferably water, to the resultant precipitate, followed by filtration, decantation, or other separation methods.

Oxidation Step

The oxidation step includes calcining the precipitate formed in the precipitation step to obtain an oxide containing Sm and Fe. The precipitate may be converted into an oxide by heat treatment, for example. The heat treatment of the precipitate requires the presence of oxygen. For example, the heat treatment may be performed in an air atmosphere. Since the presence of oxygen is necessary, the precipitate preferably contains oxygen atoms as nonmetallic constituents.

The heat treatment temperature in the oxidation step (hereinafter referred to as the oxidation temperature) is not particularly limited, but it is preferably 700 to 1300° C., more preferably 900 to 1200° C. If the temperature is below 700° C., the oxidation tends to be insufficient. If the temperature exceeds 1300° C., the intended powder particle shape, average particle size, and particle size distribution of the magnetic powder tend not to be obtained. The heat treatment duration is also not particularly limited, but it is preferably one to three hours.

The resultant oxide consists of oxide particles in which Sm and Fe have been sufficiently mixed microscopically and which reflect the properties of the precipitate such as shape and particle size distribution.

Pretreatment Step

The pretreatment step includes subjecting the oxide containing Sm and Fe to heat treatment in a reducing gas atmosphere to obtain a partial oxide in which the oxide is partially reduced. The term "partial oxide" refers to one in which the oxygen bonded to Fe is partially reduced. The oxygen concentration of the partial oxide is preferably 10% by mass or less, more preferably 8% by mass or less. The oxygen concentration may be measured by non-dispersive infrared spectroscopy (ND-IR).

The reducing gas may be appropriately selected from, for example, hydrogen ($H_2$), carbon monoxide (CO), hydrocarbon gases such as methane ($CH_4$), and combinations thereof. Hydrogen gas is preferable in terms of cost. The gas flow rate may be appropriately adjusted within a range that prevents dispersal of the oxide. The heat treatment temperature in the pretreatment step (hereinafter referred to as the pretreatment temperature) may be 300° C. or higher and 950° C. or lower. Preferably, it is 400° C. or higher, more preferably 750° C. or higher, but preferably below 900° C. A pretreatment temperature of 300° C. or higher leads to effective reduction of the oxide containing Sm and Fe, while a pretreatment temperature of 950° C. or lower inhibits the grain growth and segregation of the oxide particles so that the desired particle size can be maintained. Moreover, when the reducing gas used is hydrogen, preferably the thickness of the oxide layer used is adjusted to 20 mm or less, and the dew point in the reaction furnace is adjusted to −10° C. or lower.

Reduction Step

The reduction step includes heat treating the partial oxide in the presence of a reductant at a first temperature of 1000° C. or higher and 1090° C. or lower and then at a second temperature lower than the first temperature and in the range of 980° C. or higher and 1070° C. or lower to obtain alloy particles.

The oxide may be reduced by contact with molten calcium or calcium vapor. The first temperature is in the range of 1000° C. or higher and 1090° C. or lower, preferably of 1010° C. or higher and 1080° C. or lower. A first temperature below 1000° C. may result in insufficient reduction, while a first temperature above 1090° C. can cause formation of coarse particles resulting in reduced coercive force. The heat treatment duration is preferably less than 120 minutes, more preferably less than 90 minutes, in order to obtain a more uniform reduction reaction. The lower limit of the heat treatment duration is not particularly limited, but it is preferably 10 minutes or more, more preferably 30 minutes or more.

The second heat treatment temperature is in the range of 980° C. or higher and 1070° C. or lower, preferably of 990° C. or higher and 1060° C. or lower. A second temperature below 980° C. may fail to eliminate necking, thereby resulting in insufficient coercive force, while a second temperature above 1070° C. can cause formation of coarse particles resulting in reduced coercive force. The heat treatment duration is preferably 10 minutes or more, more preferably 30 minutes or more, in order to reduce formation of coarse particles and eliminate necking. The upper limit of the heat treatment duration is not particularly limited, but it is preferably less than 120 minutes, more preferably less than 90 minutes.

The difference between the first temperature and the second temperature is not particularly limited, but the second temperature is preferably lower than the first temperature by 15° C. or more and 60° C. or less, more preferably by 15° C. or more and 30° C. or less. A temperature difference below 15° C. can cause formation of coarse particles resulting in reduced coercive force, while a temperature difference above 60° C. may fail to eliminate necking, thereby resulting in insufficient coercive force.

The heat treatment at the first temperature and the heat treatment at the second temperature may be continuously performed. Although a heat treatment at a temperature lower than the second temperature range may be performed between these heat treatment steps, it is preferable in view of productivity to perform these steps continuously.

In the reduction step, the metallic calcium reductant may be used in combination with a disintegrating accelerator, if necessary. The disintegrating accelerator may appropriately be used to facilitate the disintegration and granulation of the product during the water washing step, which will be described later. Examples include alkaline earth metal salts such as calcium chloride and alkaline earth oxides such as calcium oxide. The disintegrating accelerator may be used in an amount of 1 to 30% by mass, preferably 5 to 30% by mass of the rare earth oxide used as the rare earth source.

The metallic calcium may be used in the form of granules or powder, and its average particle size is preferably 10 mm or less in order to more effectively reduce aggregation during the reduction reaction. The average particle size is determined by measuring the particle size of ten particles with a light microscope and then calculating the arithmetic average. The metallic calcium may be added in an amount that is 1.1 to 3.0 times, preferably 1.5 to 2.0 times the equivalent weight for the reaction (the stoichiometric amount required to reduce the rare earth oxide, which, if Fe is present as an oxide, includes the amount required to reduce the latter oxide).

Nitridation Step

The nitridation step includes nitriding the alloy particles obtained in the reduction step to obtain anisotropic magnetic particles. Since the particulate precipitate obtained in the precipitation step is used instead of fusing metals together, the alloy particles obtained in the reduction step are in porous bulk form. This permits the alloy particles to be directly heat treated in a nitrogen atmosphere for nitridation without being crushed. Thus, uniform nitridation can be achieved.

The heat treatment temperature in the nitridation of the alloy particles (hereinafter referred to as the nitridation temperature) is preferably set to 300 to 600° C., particularly preferably 400 to 550° C., and the atmosphere may be purged with nitrogen in this temperature range. The heat treatment duration may be selected so that the alloy particles can be sufficiently uniformly nitrided.

In some cases, the product resulting from the nitridation step contains, in addition to the magnetic particles, contaminants such as CaO by-product and unreacted metallic calcium, and thus forms a composite with these contaminants in sintered bulk form. In such cases, the product may be added to cool water to separate CaO and metallic calcium as suspended calcium hydroxide (Ca(OH)$_2$) from the magnetic particles. The residual calcium hydroxide may then be sufficiently removed by washing the magnetic particles with acetic acid or the like. Next, a phosphoric acid solution as a surface treatment agent may be added in the range equivalent to 0.10 to 10 wt % of PO$_4$ relative to the solids of the magnetic particles obtained in the nitridation step. The particles may appropriately be separated from the solution and dried to obtain an anisotropic magnetic powder.

The anisotropic magnetic powder produced as above is typically represented by the following formula:

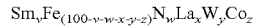

$$Sm_vFe_{(100-v-w-x-y-z)}N_wLa_xW_yCo_z$$

wherein 3≤v≤30, 5≤w≤15, 0≤x≤0.3, 0≤y≤2.5, and 0≤z≤2.5.

In the formula, v is specified as a value in the range of 3 or greater and 30 or less. This is because if the value is below 3, the unreacted iron component (α-Fe phase) may be separated, so that the coercive force of the nitride may decrease, failing to provide a practical magnet; and if the value is above 30, the element Sm may precipitate and make the magnetic powder unstable in the air, thereby resulting in a decrease in remanence. Moreover, w is specified as a value in the range of 5 or greater and 15 or less. This is because if the value is below 5, almost no coercive force may be obtained; and if the value is above 15, the element Sm or iron itself may form a nitride.

From a magnetic property standpoint, x is 0≤x≤0.3, preferably 0.11≤x≤0.22, y is 0≤y≤2.5, and z is 0≤z≤2.5.

Composite Materials

Composite materials and bonded magnets are described below.

The anisotropic magnetic powder described above may be used with a resin to prepare a composite material. Due to the presence of the anisotropic magnetic powder, the composite material provides high magnetic properties.

The resin contained in the composite material may be a thermosetting resin or a thermoplastic resin, but it is preferably a thermoplastic resin. Specific examples of the thermoplastic resin include polyphenylene sulfide resins (PPS), polyether ether ketones (PEEK), liquid crystal polymers (LCP), polyamides (PA), polypropylenes (PP), and polyethylenes (PE).

In the preparation of the composite material, the weight ratio of the resin to the anisotropic magnetic powder (resin/magnetic powder) is preferably 0.10 to 0.15, more preferably 0.11 to 0.14.

The composite material may be prepared, for example, by mixing the anisotropic magnetic powder with the resin at 280 to 330° C. using a kneading machine.

Bonded Magnets

The composite material may be used to produce a bonded magnet. Specifically, for example, the bonded magnet may be produced by heat treating the composite material in an orientation field to align the easy axes of magnetization (orientation step), followed by pulse magnetization in a magnetizing field (magnetization step).

The heat treatment temperature in the orientation step is preferably, for example, 90 to 200° C., more preferably 100 to 150° C. The magnitude of the orientation field in the orientation step may be, for example, 720 kA/m. The magnitude of the magnetizing field in the magnetization step may be, for example, 1500 to 2500 kA/m.

EXAMPLES

Examples are described below. It should be noted that "%" is by mass unless otherwise specified.

Preparation Example 1

Fe—Sm Sulfuric Acid Solution $FeSO_4 \cdot 7H_2O$ (5.0 kg) was mixed and dissolved in pure water (20.0 kg). Then, $Sm_2O_3$ (0.49 kg) and 70% sulfuric acid (0.74 kg) were added to the mixture and completely dissolved with adequate stirring. Next, pure water was added to the resultant solution to adjust the final Fe and Sm concentrations to 0.726 mol/l and 0.112 mol/l, respectively. The resulting solution was used as a Fe—Sm sulfuric acid solution.

Preparation Example 2

Fe—Sm—La Sulfuric Acid Solution $FeSO_4 \cdot 7H_2O$ (5.0 kg) was mixed and dissolved in pure water (20.0 kg). Then, $Sm_2O_3$ (0.48 kg), 31.8% $LaCl_3$ (0.071 kg), and 70% sulfuric acid (0.72 kg) were added to the mixture and completely dissolved with adequate stirring. Next, pure water was added to the resultant solution to adjust the final Fe, Sm, and La concentrations to 0.726 mol/l, 0.109 mol/l, and 0.0063 mol/l, respectively. The resulting solution was used as a Fe—Sm—La sulfuric acid solution.

Preparation Example 3

Fe—Sm—La—Co Sulfuric Acid Solution $FeSO_4 \cdot 7H_2O$ (5.0 kg) was mixed and dissolved in pure water (20.0 kg). Then, $Sm_2O_3$ (0.48 kg), 31.8% $LaCl_3$ (0.071 kg), 20.8% cobalt sulfate (0.015 kg), and 70% sulfuric acid (0.72 kg) were added to the mixture and completely dissolved with adequate stirring. Next, pure water was added to the resultant solution to adjust the final Fe, Sm, La, and Co concentrations to 0.726 mol/l, 0.109 mol/l, 0.0063 mol/l, and 0.002 mol/l, respectively. The resulting solution was used as a Fe—Sm—La—Co sulfuric acid solution.

Example 1

Fe—Sm

Precipitation Step

The whole amount of the Fe—Sm sulfuric acid solution obtained in Preparation Example 1 was added dropwise to pure water (20 kg) maintained at 40° C. with stirring over 70 minutes from the start of the reaction. At the same time, a 15% ammonia solution was added dropwise to adjust the pH to 7 to 8. Thus, a slurry containing a Fe—Sm hydroxide was obtained. The slurry was washed with pure water by decantation, followed by separating the hydroxide by solid-liquid separation. The separated hydroxide was dried in an oven at 100° C. for 10 hours.

Oxidation Step

The hydroxide obtained in the precipitation step was calcined in the air at 900° C. for one hour. After cooling, a red Fe—Sm oxide was obtained as starting powder.

Pretreatment Step

The Fe—Sm oxide (100 g) obtained as above was put into a steel vessel to a bulk height of 10 mm. The vessel was placed in a furnace, and the pressure was decreased to 100 Pa. Then, the vessel was heated to a pretreatment temperature of 850° C. while introducing hydrogen gas, and this temperature was maintained for 15 hours. The oxygen concentration of the resulting oxide was measured by non-dispersive infrared spectroscopy (ND-IR) (EMGA-820 available from HORIBA, Ltd.) and found to be 5% by mass. Thus, it was shown that a black partial oxide was obtained in which the oxygen bonded to Sm remained unreduced while 95% of the oxygen bonded to Fe was reduced.

Reduction Step

The partial oxide (60 g) obtained in the pretreatment step and metallic calcium (19.2 g) having an average particle size of about 6 mm were mixed together and placed in a furnace. After the furnace was vacuum evacuated, argon gas (Ar gas) was introduced. The temperature was increased to a first temperature of 1045° C. and maintained for 45 minutes, and then cooled to a second temperature of 1000° C. and maintained for 30 minutes. Thus, Fe—Sm alloy particles were obtained.

Nitridation Step

Subsequently, the interior of the furnace was cooled to 100° C. and then vacuum evacuated. The temperature was increased to 450° C. while introducing nitrogen gas, and this temperature was maintained for 23 hours. Thus, a bulk product containing magnetic particles was obtained.

Water Washing/Surface Treatment Step

The bulk product obtained in the nitridation step was added to pure water (3 kg), followed by stirring for 30 minutes. After the mixture was allowed to stand, the supernatant was discharged by decantation. The addition to pure water, stirring, and decantation were repeated 10 times. Then, 99.9% acetic acid (2.5 g) was added, followed by stirring for 15 minutes. After the mixture was allowed to stand, the supernatant was discharged by decantation. The addition to pure water, stirring, and decantation were repeated twice.

A phosphoric acid solution was added to the resultant slurry. The phosphoric acid solution was added in an amount equivalent to 1 wt % of $PO_4$ relative to the solids of the magnetic particles. The mixture was stirred for five minutes, followed by solid-liquid separation and then vacuum-drying at 80° C. for three hours to obtain a magnetic powder. The magnetic powder was represented by $Sm_{9.50}Fe_{76.92}N_{13.58}$.

Examples 2 to 10 and Comparative Examples 1 to 3

Magnetic powders were prepared in the same manner as in Example 1, except that the first temperature and its retention time and the second temperature and its retention time were changed as shown in Table 1.

Evaluation

Magnetic Properties

The magnetic particles obtained by the production method of each example were packed into a sample vessel together with a paraffin wax. After the paraffin wax was melted with a dryer, the easy axes of magnetization were aligned in an orientation field of 16 kA/m. The magnetically oriented sample was pulse magnetized in a magnetizing field of 32 kA/m, and the coercive force (iHc) of the sample was measured using a vibrating sample magnetometer (VSM) with a maximum field of 16 kA/m. Table 1 shows the evaluation results.

TABLE 1

| Example No. | First reduction temperature | | Second reduction temperature | | iHc (Oe) |
|---|---|---|---|---|---|
| | Temperature (° C.) | Duration (min) | Temperature (° C.) | Duration (min) | |
| Example 1 | 1045 | 45 | 1000 | 30 | 15330 |
| Example 2 | 1045 | 45 | 1000 | 60 | 15980 |
| Example 3 | 1045 | 45 | 1015 | 60 | 15260 |
| Example 4 | 1045 | 45 | 1030 | 60 | 15400 |
| Example 5 | 1045 | 45 | 1030 | 15 | 14130 |
| Comparative Example 1 | 1045 | 45 | — | — | 13980 |
| Comparative Example 2 | 1045 | 120 | — | — | 12950 |
| Example 6 | 1075 | 45 | 1000 | 60 | 14680 |
| Example 7 | 1075 | 45 | 1015 | 60 | 14080 |
| Example 8 | 1075 | 45 | 1030 | 60 | 13880 |
| Example 9 | 1075 | 45 | 1045 | 60 | 13660 |
| Example 10 | 1075 | 45 | 1060 | 60 | 13530 |
| Comparative Example 3 | 1075 | 45 | — | — | 10910 |

According to the results in Table 1, the reduction only at a single temperature resulted in reduced coercive force iHc as shown in Comparative Examples 1 to 3. In contrast, as shown in Examples 1 to 10, the heat treatment at a first temperature and further at a second temperature lower than the first temperature resulted in greatly improved coercive force iHc.

Example 11 and Comparative Examples 4 and 5

Magnetic powders were prepared in the same manner as in Example 1, except that the Fe—Sm—La sulfuric acid solution obtained in Preparation Example 2 was used, and the first temperature and its retention time and the second temperature and its retention time were changed as shown in Table 2. The magnetic powders were represented by $Sm_{9.08}Fe_{77.2}N_{13.63}La_{0.09}$. Table 2 shows the results of measurements of the coercive force (iHc) of the magnetic powders.

TABLE 2

| Example No. | First reduction temperature | | Second reduction temperature | | iHc (Oe) |
|---|---|---|---|---|---|
| | Temperature (° C.) | Duration (min) | Temperature (° C.) | Duration (min) | |
| Example 11 | 1045 | 45 | 1030 | 60 | 12280 |
| Comparative Example 4 | 1045 | 45 | — | — | 11400 |
| Comparative Example 5 | 1045 | 120 | — | — | 9564 |

According to the results in Table 2, even in the case of anisotropic magnetic powders containing La, the reduction only at a single temperature resulted in reduced coercive force iHc as shown in Comparative Examples 4 and 5. In contrast, as shown in Example 11, the heat treatment at a first temperature and further at a second temperature lower than the first temperature resulted in greatly improved coercive force iHc.

Examples 12 to 19 and Comparative Examples 6 and 7

Precipitation Step

The whole amount of the Fe—Sm—La sulfuric acid solution obtained in Preparation Example 2 was added dropwise to pure water (20 kg) maintained at 40° C. with stirring over 70 minutes from the start of the reaction. At the same time, a 15% ammonia solution and a 12.5% ammonium tungstate solution (50 g) were added dropwise to adjust the pH to 7 to 8. Thus, a slurry containing a Fe—Sm—La—W hydroxide was obtained. The slurry was washed with pure water by decantation, followed by separating the hydroxide by solid-liquid separation. The separated hydroxide was dried in an oven at 100° C. for 10 hours.

The steps subsequent to the precipitation step were performed in the same manner as in Example 1, except that the first temperature and its retention time and the second temperature and its retention time were changed as shown in Table 3, whereby a magnetic powder was obtained. The magnetic powder was represented by $Sm_{9.49}Fe_{76.8}N_{13.55}La_{0.09}W_{0.07}$. Table 3 shows the results of measurements of the coercive force (iHc) of the magnetic powders prepared as above.

TABLE 3

| Example No. | First reduction temperature | | Second reduction temperature | | iHc (Oe) |
|---|---|---|---|---|---|
| | Temperature (° C.) | Duration (min) | Temperature (° C.) | Duration (min) | |
| Example 12 | 1045 | 45 | 1000 | 60 | 18520 |
| Example 13 | 1045 | 45 | 1015 | 60 | 16390 |
| Example 14 | 1045 | 45 | 1030 | 60 | 17130 |
| Comparative Example 6 | 1045 | 120 | — | — | 12910 |
| Example 15 | 1075 | 45 | 1000 | 60 | 16570 |
| Example 16 | 1075 | 45 | 1015 | 60 | 15340 |
| Example 17 | 1075 | 45 | 1030 | 60 | 14750 |
| Example 18 | 1075 | 45 | 1045 | 60 | 14850 |
| Example 19 | 1075 | 45 | 1060 | 60 | 14760 |
| Comparative Example 7 | 1075 | 45 | — | — | 13690 |

According to the results in Table 3, even in the case of anisotropic magnetic powders containing La and W, the reduction only at a single temperature resulted in reduced coercive force iHc as shown in Comparative Examples 6 and 7. In contrast, as shown in Examples 12 to 19, the heat treatment at a first temperature and further at a second temperature lower than the first temperature resulted in greatly improved coercive force iHc.

Examples 20 and 21 and Comparative Examples 8 and 9

Magnetic powders were prepared in the same manner as in Examples 12 to 19, except that the Fe—Sm—La—Co sulfuric acid solution obtained in Preparation Example 3 was used, and the first temperature and its retention time and the second temperature and its retention time were changed as shown in Table 4. The magnetic powders were represented by $Sm_{9.06}Fe_{76.98}N_{13.58}La_{0.09}W_{0.06}Co_{0.23}$. Table 4 shows the results of measurements of the coercive force (iHc) of the magnetic powders.

TABLE 4

| Example No. | First reduction temperature | | Second reduction temperature | | iHc (Oe) |
| --- | --- | --- | --- | --- | --- |
| | Temperature (° C.) | Duration (min) | Temperature (° C.) | Duration (min) | |
| Example 20 | 1045 | 45 | 1030 | 60 | 17310 |
| Example 21 | 1045 | 45 | 1030 | 60 | 16030 |
| Comparative Example 8 | 1045 | 45 | — | — | 14680 |
| Comparative Example 9 | 1045 | 45 | — | — | 14310 |

According to the results in Table 4, even in the case of anisotropic magnetic powders containing La, W, and Co, the reduction only at a single temperature resulted in reduced coercive force iHc as shown in Comparative Examples 8 and 9. In contrast, as shown in Examples 20 and 21, the heat treatment at a first temperature and further at a second temperature lower than the first temperature resulted in greatly improved coercive force iHc.

Since the anisotropic magnetic powders obtained by the production method of the present invention have high magnetic properties, they are suitably applicable to composite materials and bonded magnets for motors or other applications.

What is claimed is:

1. A method of producing an anisotropic magnetic powder, comprising:
   pretreating an oxide containing Sm and Fe by heat treatment in a reducing gas atmosphere to obtain a partial oxide;
   heat treating the partial oxide in the presence of a reductant at a first temperature of 1000° C. or higher and 1090° C. or lower and then at a second temperature lower than the first temperature and in a range of 980° C. or higher and 1070° C. or lower to obtain alloy particles; and
   nitriding the alloy particles to obtain an anisotropic magnetic powder,
   wherein the heat treatment at the second temperature is performed for 10 minutes or more.

2. The method of producing an anisotropic magnetic powder according to claim 1,
   wherein the second temperature is lower than the first temperature by 15° C. or more and 60° C. or less.

3. The method of producing an anisotropic magnetic powder according to claim 1,
   wherein the heat treatment at the first temperature and the heat treatment at the second temperature are continuously performed.

4. The method of producing an anisotropic magnetic powder according to claim 1,
   wherein the heat treatment at the first temperature is performed for less than 120 minutes.

5. The method of producing an anisotropic magnetic powder according to claim 1, wherein the oxide containing Sm and Fe further contains La.

6. The method of producing an anisotropic magnetic powder according to claim 1, wherein the oxide containing Sm and Fe further contains W.

7. The method of producing an anisotropic magnetic powder according to claim 1, wherein the oxide containing Sm and Fe further contains Co.

* * * * *